United States Patent
Allen

(10) Patent No.: US 7,450,590 B2
(45) Date of Patent: Nov. 11, 2008

(54) CONSTRUCTION OF A PATH THROUGH A PACKET NETWORK

(75) Inventor: John Aubrey Allen, Kenilworth (GB)

(73) Assignee: Ericsson AB, Stockholm (SE)

( * ) Notice: Subject to any disclaimer, the term of this patent is extended or adjusted under 35 U.S.C. 154(b) by 390 days.

(21) Appl. No.: 10/535,001

(22) PCT Filed: Nov. 13, 2003

(86) PCT No.: PCT/GB03/04931

§ 371 (c)(1), (2), (4) Date: May 12, 2005

(87) PCT Pub. No.: WO2004/047381

PCT Pub. Date: Jun. 3, 2004

(65) Prior Publication Data

US 2006/0050712 A1    Mar. 9, 2006

(30) Foreign Application Priority Data

Nov. 16, 2002 (GB) ................................ 0226819.1

(51) Int. Cl.
*H04L 12/56* (2006.01)

(52) U.S. Cl. .................. 370/395.2; 370/230; 370/235

(58) Field of Classification Search ................. 370/230, 370/254, 407, 310, 239, 389–395, 351–352, 370/231, 394, 235, 229, 236, 354, 356, 397, 370/401, 395.2; 379/229; 709/208, 220, 709/223, 226–227, 237–238, 245, 249
See application file for complete search history.

(56) References Cited

U.S. PATENT DOCUMENTS

| 6,418,148 | B1 * | 7/2002 | Kumar et al. ............... 370/468 |
| 6,449,251 | B1 * | 9/2002 | Awadallah et al. .......... 370/229 |
| 6,904,017 | B1 * | 6/2005 | Meempat et al. ............ 370/238 |
| 6,973,035 | B2 * | 12/2005 | Seddigh et al. ............. 370/235 |
| 2002/0085494 | A1 * | 7/2002 | Seddigh et al. ............. 370/235 |
| 2006/0002297 | A1 * | 1/2006 | Sand et al. .................. 370/235 |
| 2006/0133272 | A1 * | 6/2006 | Yuan et al. .................. 370/230 |

FOREIGN PATENT DOCUMENTS

| WO | WO 00/76254 A1 | 12/2000 |
| WO | WO 01/65782 A1 | 9/2001 |

* cited by examiner

*Primary Examiner*—Pablo N Tran
(74) *Attorney, Agent, or Firm*—Kirschstein, et al.

(57) ABSTRACT

To construct a path through a packet network from a source host address to a destination host address via at least one lower capacity link controlled by at least one admission control device, a list of other host addresses controlled by the admission control device is returned to permit reuse of part of the path with reduced signaling.

20 Claims, 3 Drawing Sheets

CONSTRUCTION OF A PATH THROUGH A PACKET NETWORK

This invention relates to the construction of a path through a packet network, especially for the purpose of obtaining a desired quality of service (QoS).

Traditional non-real-time Internet traffic such as e-mail and file downloads is designed to accommodate packet loss and delay in receipt of packets. New Internet applications such as transmission of video and voice traffic as in IP telephony require prioritisation of traffic e.g. at routers, and this is done by specifying a particular level of QoS. For example, reservations of resources in low capacity links are made in Resource Reservation Protocol (RSVP) or Integrated Services (intserv). Referring to FIG. 1, which shows schematically interconnecting links in a packet network and FIG. 2, which shows schematically the reservations set up in the links, host A is a PC connected on a high capacity Ethernet 1, which is connected by a low capacity link 2 (typically a dial-up modem connection or DSL (digital subscriber's line) access network) to the high capacity network 4 of an Internet Service Provider (ISP). Host B is a PC similarly connected to an ISP network 5 via high capacity network 3 and low capacity link 7. The two ISP networks are also interconnected by a low capacity link 6. Since traffic flow, and hence congestion, on the low capacity links may be different in each direction, the low capacity links are considered separately in each direction, so return low capacity links 8 to 10 are also shown. Routers (not shown) are provided between each adjacent pairs of links.

To establish QoS paths across such a network, checks must be made for available resources within each link that will be traversed by the path. Simple resource reservation protocols, such as RSVP, Integrated Services, make checks at all the routers along the path, using admission control devices.

In FIG. 1, using later standards (such as combined Intserve/Diffserve networks) checks are only made at the entry to low capacity links. Admission control devices 11 to 13 in the forward direction and 14 to 16 in the reverse direction are provided for this purpose.

Referring to FIG. 2, using the later standards, a request is signalled from host A to host B, being forwarded from each admission control device 11 to 13 in turn. At each such constriction point, the available network resources are checked, and the request granted or denied. Successful set up of the path results in the reservation state being stored in every intervening device controlling admission to a constriction point, and in the pair of hosts (first pair of lines). After use of the QoS path is complete, further signalling is required to tear down the path and release the state held in each of the admission control devices (second pair of lines), the release message being forwarded at each of the admission control devices in turn.

A subsequent reservation, for example, host A to host C also on the high capacity network 3, would require the same processing for call set-up (third pair of lines), and call tear-down (fourth pair of lines).

For large bandwidth applications such as video, where the video signal is of the order of several Mbits/second, the processing facilities incorporated into the router would be adequate but, for telephony, which could entail millions of 10 Kbits/second calls, the processing facilities would not be.

Use of the processing facilities could be reduced by delaying tear down of a reservation in the hope that the path can be reused for another session in the near future, but this would not provide much improvement since the chances of a second session between the same pair of hosts being required shortly after the first is extremely low.

The invention provides means for attempting to construct a path through a packet network from a source host address to a destination host address, comprising means for signalling to a device for controlling admission to a section of the desired path, and for returning information on a range of host addresses controlled by that admission control device.

The invention also provides a method for attempting to construct a path through a packet network from a source host address to a destination host address, comprising signalling to a device for controlling admission to a section of the desired path, and returning information on a range of host addresses controlled by that admission control device.

The chances of a second session to another host in the address range being required in the near future are much greater, enabling reduced signalling to the admission control device for reservation and release to be achieved.

The admission control device preferably controls the destination host address as it may be the last admission control device in the path.

The rate of the section of the desired path may be less than one half, preferably less than one tenth, of the rate of the preceding section of the path.

The invention will now be described in detail, by way of example, with reference to the accompanying drawings, in which.

Figure 1:
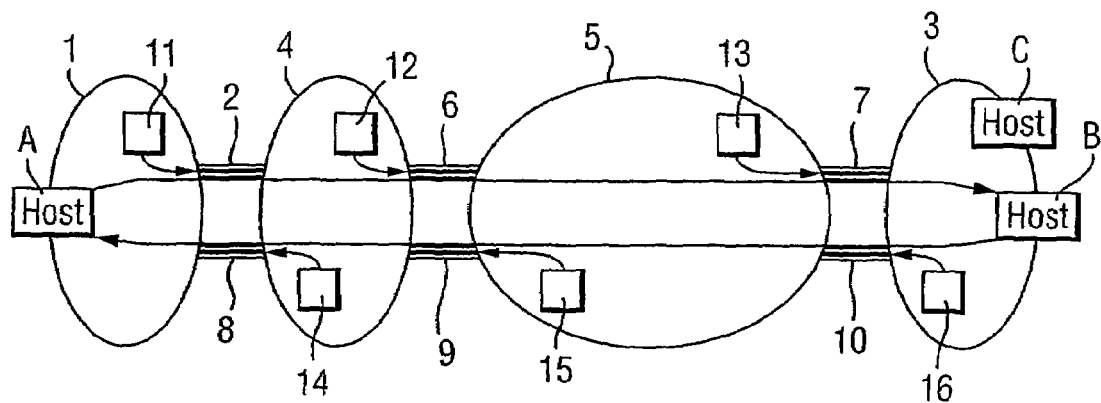
FIG. 1 shows schematically interconnecting links in a known packet network in which a QoS reservation is to be made.
Figure 2:
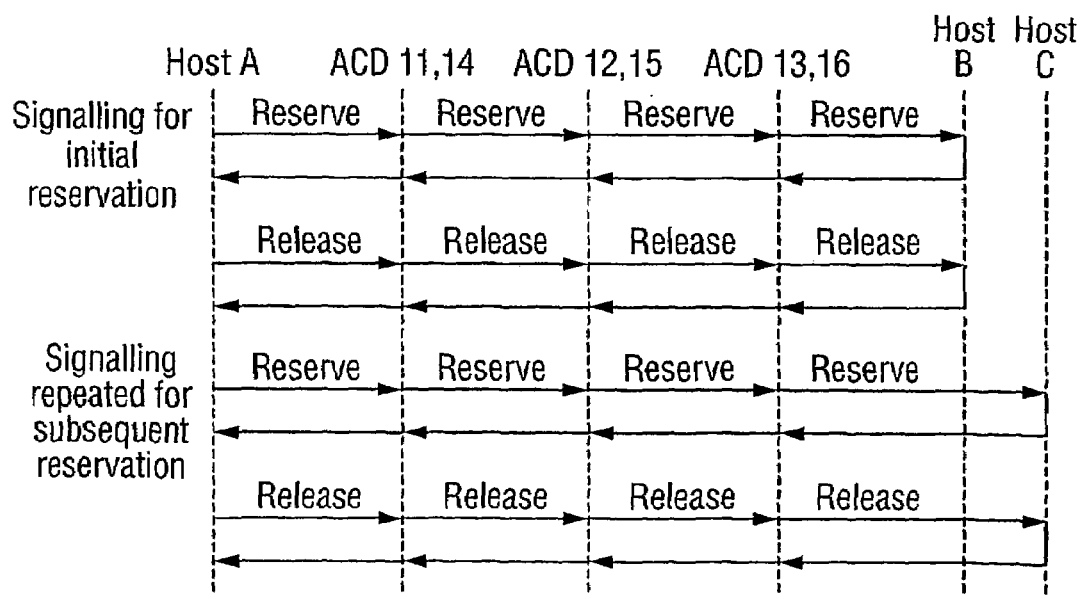
FIG. 2 shows schematically the reservations set up in the links of FIG. 1.
Figure 3:
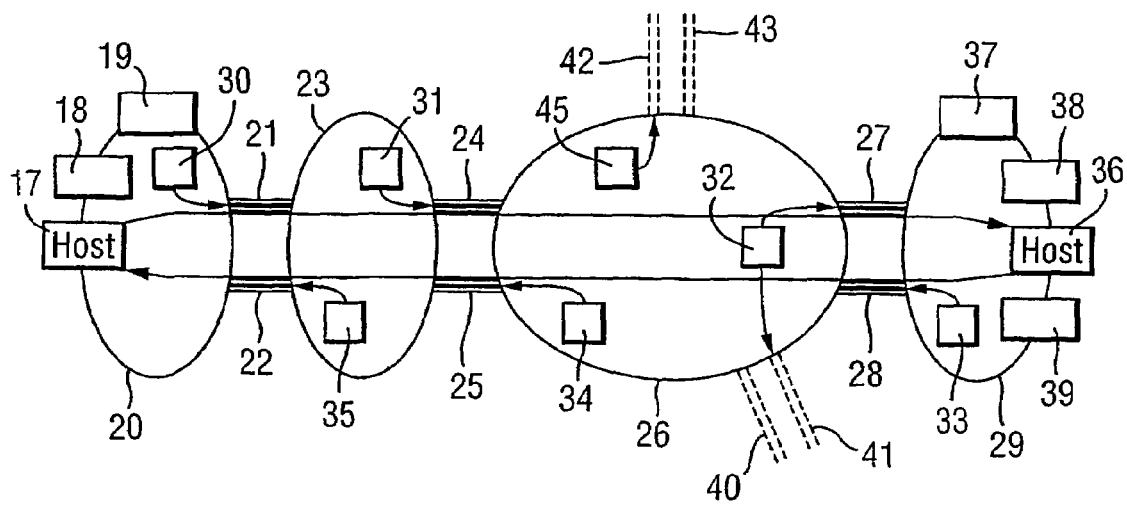
FIG. 3 is a representation of a part of a packet network according to the invention in which QoS reservations are to be made.

Referring to FIG. 3, a number of host computers 17, 18, 19 are connected in a high capacity Ethernet 20, and one of the hosts, viz host 17, is connected e.g. for internet telephony, through a packet network with a host computer 36, also connected in a high capacity network 29 along with other host computers 37, 38, 39. The high capacity networks 20, 29 are connected with respective high capacity ISP networks 23, 26. Low capacity links denoted 21, 22; 27, 28; 24, 25 interconnect the networks 20, 23; 26, 29; 23, 26, respectively. Traffic flow, and hence congestion, on the low capacity links may be different in each direction, so the low capacity links are shown separately in each direction. Low capacity networks 21, 22; 27, 28 could be dial-up connections operating at 64 kbits/sec. The high capacity networks 20, 23, 26, 29 could operate at 100 Mbits/second. Routers (not shown) are provided at the interconnections of the networks. Typically the packet network is a connectionless network.

Admission control devices 30 to 32 are provided at the inputs to the low capacity links 21, 24, 27 in the outgoing direction from host 17, and admission control devices 33 to 35 are provided at the input to the low capacity links 28, 25, 22 in the return direction.

Figure 4:
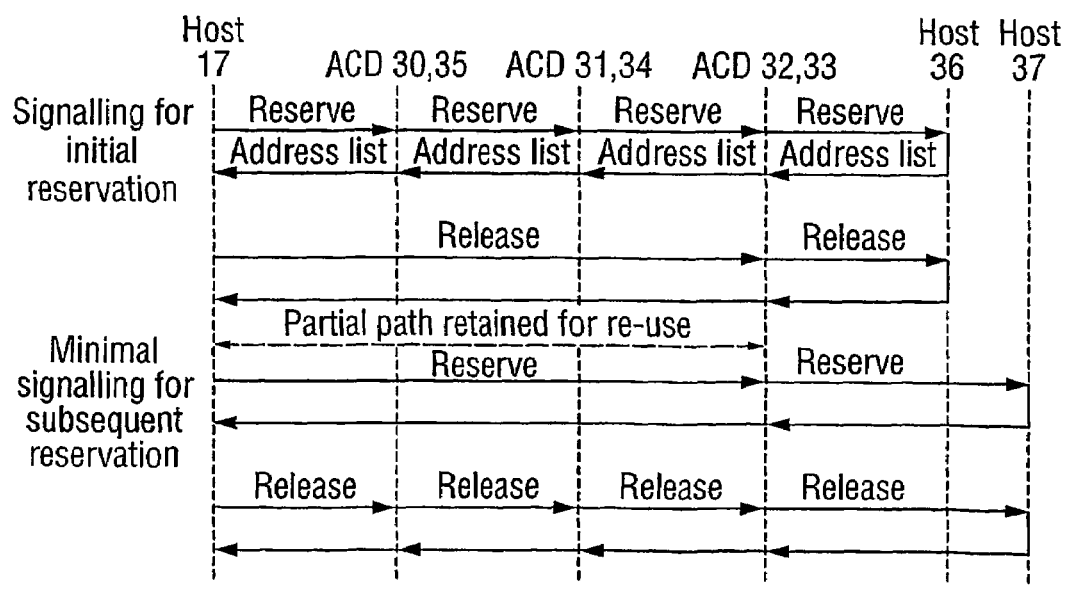
FIG. 4 shows schematically the reservations set up in the packet network of FIG. 3.

Referring to FIGS. 3 and 4, when the host 17 requests the original connection to host 36 (whose IP address is, say, 200.150.70.40), signalling and storage means (not shown) signals from host 17 along the route shown in FIG. 3 and back again to host 17 to check at the admission control devices whether network resources are available. If the network resources are available, a reservation is made. The message is forwarded by each admission control device in turn (FIG. 4, first pair of lines). The signalling uses an extended form of RSVP, but RSVP itself, or other reservation protocols, can be used if desired. Checks are not made at the inputs to the high capacity networks as these have been designed to have sufficient capacity to ensure that congestion will not occur. Successful set up of the path results in a reservation state being stored in the admission control devices 30 to 35 and in the hosts 17 and 36.

In accordance with the invention, the information passed in the signalling of the original path set-up includes an address list of other host addresses for which the reservations are also valid (FIG. 4, first pair of lines). For example, the other hosts 37 to 39, being on the high capacity network to which a reservation has been made, would also be available. Thus, the addresses 200.150.70.39, 200.150.70.38, and 200.150.70.37, the addresses of the hosts 37 to 39, would be returned to the host 17. Alternatively, the return address could be 200.150.70.X, indicating any address within the subnet containing host 36. In addition, the information passed in the signalling of the original path set-up includes the identity i.e. the address of the last admission control device in the path. It is used to identify the device to which signalling should be directed when communicating through the "pipe" created by the reservations at the admission control devices.

When the host 17 terminates the connection to the host 36, instead of signalling to tear down the path and release the state held in each of the admission control devices as hitherto, the signalling only tears down the connection to the host 36 in the local high capacity network 29 but maintains the state held in each of the admission control devices 30 to 35 (FIG. 4, second pair of lines). The address of the admission control device 32 returned with the address list is used to enable the release message to be sent directly from host 17 to admission control device 32 instead of forwarding it at each of the intermediate admission control devices 30, 31. The release message is forwarded from admission control device 32 to the host 36, and returned to admission control device 32 and, from there, directly to host 17. The release signal for the host 36 passes through the admission control devices 30-35 but does not alter the state held on them, thus retaining the partial path through the admission control devices 30-35 for re-use. Typically, the state would be maintained for a few minutes before being torn down (FIG. 4, last pair of lines) depending on the current traffic levels. There is a tradeoff between wasting network capacity in unused reservations and overloading the admission control devices with excessive signalling.

If the host 17 desires to establish communication with the host 37, say, or another host in the local high capacity network 29, no further signalling is required, other than to the new host in question FIG. 4, third pair of lines). This means that signalling to the admission control devices 30 to 35 for both tear down and reservation has been avoided. A signal sent to the admission control device 32 from the host 17 is forwarded to the host 37, and returns to the host 17 via the admission control device 33.

If it had been the case that the admission control device for the low capacity link 27, 28 was not available, so that the reservation was denied instead of being granted, the same list of addresses would be returned as for when it was granted. This could be used to avoid making futile requests for similar paths that would also be rejected. It can also act as a trigger for initiation of other traffic control mechanisms such as call gapping. Call gapping is a technique used within existing telephone networks when congestion is encountered. It reduces the load near the destination of the call by acting at the source exchange to reject all call attempts that occur within seconds of a previous call to the congested destination. It is often the reason that it is difficult to get through to popular destinations such as TV phone-in voting lines.

In the embodiment described, the admission control devices are only positioned at the input to networks of restricted capacity, but it would be possible to position admission control devices at the inputs to the networks of high capacity as well, such as from the low capacity link 27, 28 connecting to the high capacity network 29. These could be signalled when a connection was to be set up and reserved and released states stored accordingly.

In the embodiment described, the signalling and storage means is implemented in the form of software, and the list of available/unavailable addresses and the addresses of the last admission control device in the pipe, may be stored in the host 17. This implies that each host would be able to store such an address list. Instead, or in addition, the list of available addresses could be stored in each admission control device controlling the entry to the low capacity links along the path from source host 17 to destination host 36 and back. Initial deployments will try to avoid changing every host, and so the option of storing the lists in the admission control devices will be used. The penalty of this approach is that the host will contact its nearest admission control device for every new connection. As the opportunity to change hosts arises, these messages can be avoided by storing address lists in the hosts.

The admission control devices, in turn, could be incorporated in routers adjacent to the low capacity links.

If the edge networks 20, 29 are high capacity shared mediums, such as Ethernet, and are such that the hosts 17 etc., 36 etc. do not actively participate in the quality of service path set-up, no signalling at all is required for reuse, either to any host 36-39 in the network 29 or from any host 17-20 in the network 20. In this case it would not be necessary to return the address of admission control device 32.

In most networks, resignalling is restricted to the first and last admission control devices and the associated hosts. Since no action is required at intermediate admission control devices, the overall capacity and scalability of the quality of service network is enhanced.

In a modification of the embodiment described above, the ISP network 26 may have other low capacity links 40, 41; 42, 43 (shown dotted), similar to the links 27, 28. Admission control device 45 is provided to control the entry of traffic from the ISP network 26 onto link 42, but admission control device 32, which control the addresses on network 29, is used to control access to link 41 and the addresses reached thereby also. Other admission control devices (not shown) control data flow in the reverse direction.

The address lists returned will depend, as for the unmodified FIG. 3 embodiment, upon whether additional signalling is needed to complete further reservations.

If no additional signalling is required, then the address range of the host addresses which can be reached would be returned. Depending on the allocation of addresses to networks, this could either be a list of host addresses, a list of wildcarded addresses, or a single wildcarded address. In the case where an admission control device such as 32 controls more than one link, then multiple wildcarded addresses would be used, such as 200.150.70.X (denoting any address on the subnet 29) and 200.150.71.X (denoting any address on the subnet accessed via the low capacity link 40, 41). If a single admission control device controlled all links from the network 26, then a single wildcarded address such as 200.150.X.X could be used.

If additional signalling is required for further reservations, then the address of the admission control device is returned, together with the address list indicated above indicating the ranges controlled by that admission control device.

In all cases the address ranges indicate the host addresses that can be reached. The admission control device address is returned separately if required for use in further reservations.

A further enhancement to the path set-up signalling allows paths to be set up only as far as the admission control device controlling a particular constriction point which must be used to reach a particular range of addresses. This permits paths to be constructed without having a remote host name, and then subsequently reused for new sessions. This is accomplished by a router examining address ranges returned in the signalling for multiple reservations and detecting overlapping ranges from concurrent sessions. The router can then construct a new reservation to the range, without requiring knowledge of any individual host address within that range. Using the modified version of the network of FIG. 3 as an example, with the admission control device 32 controlling link 27 and link 41, a reservation could be made by host 17 to host 36, resulting in a response from admission control device 32 indicating an address list of (200.150.70.X, 200.150.71.X). A second reservation to a host in the network accessed via link 41 would return the same address range from the admission control device 32. This indicates that a tunnel to the common point of these two address lists could be useful for further traffic. A wildcarded request to 200.150.X.X could therefore be made.

In addition to the reuse of individual reservations, the present invention can be applied to the construction of tunnels (for example as in RSVP-TE). Construction of a tunnel permits multiple reservations to be established inside the single tunnel reservation with minimal signalling at intermediate routers. The present invention provides additional information about the address ranges local to the end of the tunnel, thereby simplifying the identification of new reservations that could benefit from using the tunnel.

Such tunnels could be constructed automatically in response to changing traffic patterns, using the following sequence of operations. First, a number of individual reservations are constructed as required by host applications. Address range information returned during construction of these reservations is compared, the address ranges of commonly used destinations is identified, and the possibility of constructing tunnels to these popular destinations is evaluated. If a tunnel is required, it can be constructed using the address range reservation technique described with reference to FIGS. 3 and 4. New reservations can then be constructed within the tunnel, and the existing individual reservations deleted as their application sessions terminate.

Figure 5:
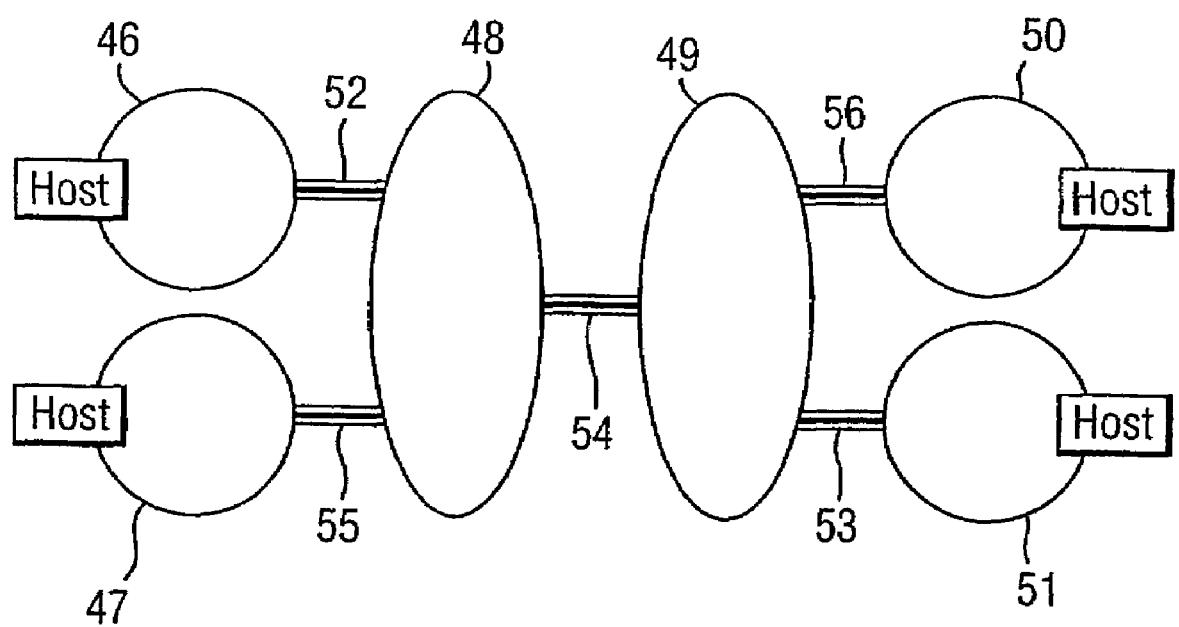
FIG. 5 shows schematically interconnecting links in another packet network according to the invention in which tunnels are constructed.

For example, referring to FIG. 5, hosts in high capacity networks 46, 51 may connect to high capacity networks 48, 49, which could be ISPs, via low capacity links 43-47. The high capacity links could operate at 100 Mbits/second and the low capacity links at 512 kbits/second or less. Admission control devices (not shown) are provided at the inputs to the low capacity links in each direction of flow.

In the network of FIG. 5, several separate reservations may be constructed from hosts in network 46 to hosts in network 51 via intermediate networks 48, 49 and links 52-54. The address range information returned for all of these reservations will be the same, indicating the range occupied by network 51. The signalling load at admission control devices associated with links 52-54 would be reduced if a tunnel reservation were established between networks 46 and 51 and future reservations constructed within this tunnel. A device within network 46 may establish this tunnel using a reservation specifying the subnet address of network 51 as described earlier.

In a network where scarce resources are consumed by reservations, there can be problems with this approach. The individual reservations can consume so much of the available resource there is little space left to construct the tunnel. Although it would be possible to initially construct small tunnel and subsequently modify it to increase its size as each of the individual reservations is deleted, there is the possibility that resources freed by the individual reservations will be consumed by other devices in the network before the tunnel can be expanded to use them. The present invention includes additional signalling to move an individual reservation into a tunnel as an atomic operation (i.e. a non-interruptible operation) so that the tunnel is expanded to include the resources of the individual reservation. This permits a tunnel to be constructed that initially consumes only a small (or even zero) quantity of network resources, and the individual reservations can be moved into it. The resulting tunnel expands to a size only slightly larger than the total of the existing reservations.

Thus, with reference to the individual reservations and automatically generated tunnel reservation described with reference to FIG. 5, if the existing reservations occupy most of the resources of one of the links (say link 54), then it may not be possible to establish a tunnel of the required size while simultaneously preserving the existing reservations between networks 46 and 51. If a small size tunnel is established, with the intention of expanding it as the existing reservations are torn down, then there is the possibility that during that time between removal of a reservation and expansion of the tunnel, the capacity so freed on link 54 may be reserved for use in a path between networks 47 and 50. The additional signalling referred to in the last paragraph is a mechanism for transferring the resources freed from the individual reservation into a tunnel reservation traversing the same path without the possibility of interruption by other reservation activities occurring within the network.

The invention claimed is:

1. A path construction means for attempting to construct a path through a packet network from a source host address to a destination host address, comprising:
   means for signaling to an admission control device for controlling admission to a section of the path, and for returning information on a range of host addresses controlled by the admission control device;
   another admission control device for controlling admission to another section of the path;
   means for maintaining a reservation state in the admission control devices when setting up a reservation to another host address controlled by the first-mentioned admission control device; and
   means for examining address ranges returned from multiple reservations, and for detecting overlapping ranges from concurrent sessions.

2. The path construction means as claimed in claim 1, in which the signaling means is operative for returning the address of the first-mentioned admission control device.

3. The path construction means as claimed in claim 2, in which the signaling means is operative for directly signaling to the first-mentioned admission control device when selling up a reservation to another host address controlled by the first-mentioned admission control device.

4. The path construction means as claimed in claim 1, in which the admission control device has a release state and a reserved state arranged to achieve a desired quality of service.

5. The path construction means as claimed in claim 1, wherein the signaling means is operative for returning the information in conjunction with information passed in an attempt to set up a reservation between a source host and a destination host.

6. The path construction means as claimed in claim 1, wherein a tunnel reservation is constructed.

7. The path construction means as claimed in claim 6, in which the first-mentioned admission control device is arranged to provide address information local to an end of a tunnel.

8. The path construction means as claimed in claim 7, including means for moving another reservation in the network into the tunnel.

9. The path construction means as claimed in claim 1, in which a rate of the section of the path is less than one half of a rate of a preceding section of the path.

10. The path construction means as claimed in claim 8, in which the rate of the section of the path is less than one tenth of the rate of the preceding section of the path.

11. A method of attempting to construct a path through a packet network from a source host address to a destination host address, comprising the steps of:
    signaling to an admission control device for controlling admission to a section of the path;
    returning information on a range of host addresses controlled by the admission control device;
    returning the information in conjunction with information passed in an attempt to set up a reservation between a source host and a destination host;
    examining address ranges returned from multiple reservations; and
    detecting overlapping ranges from concurrent sessions.

12. The method as claimed in claim 11, including another admission control device for controlling admission to another section of the path, and maintaining a reservation state in the admission control devices when setting up the reservation to another host address controlled by the first-mentioned admission control device.

13. The method as claimed in claim 11, in which the signaling step is performed by returning the address of the first-mentioned admission control device.

14. The method as claimed in claim 13, in which the signaling step is performed by signaling directly to the first-mentioned admission control device when setting up the reservation to another host address controlled by the first-mentioned admission control device.

15. The method as claimed in claim 11, in which the admission control device has a release state and a reserved state arranged to achieve a desired quality of service.

16. The method as claimed in claim 11, and constructing a tunnel reservation.

17. The method as claimed in claim 16, in which the first-mentioned admission control device provides address information local to an end of a tunnel.

18. The method as claimed in claim 17, including moving another reservation in the network into the tunnel.

19. The method as claimed in claim 11, in which a rate of the section of the path is less than one half of a rate of a preceding section of the path.

20. The method as claimed in claim 19, in which the rate of the section of the path is less than one tenth of the rate of the preceding section of the path.

* * * * *

UNITED STATES PATENT AND TRADEMARK OFFICE
CERTIFICATE OF CORRECTION

PATENT NO. : 7,450,590 B2 Page 1 of 1
APPLICATION NO. : 10/535001
DATED : November 11, 2008
INVENTOR(S) : Allen It is certified that error appears in the above-identified patent and that said Letters Patent is hereby corrected as shown below:

On the Title Page, Item (75), under "Inventor", Line 1, delete "Kenilworth" and insert -- Warwickshire --, therefor.

In Column 3, Line 53, delete "FIG." and insert -- (FIG. --, therefor.

In Column 4, Line 34, delete "reuse," and insert -- re-use, --, therefor.

In Column 6, Line 62, in Claim 3, delete "selling" and insert -- setting --, therefor.

In Column 7, Line 18, in Claim 10, delete "8," and insert -- 9, --, therefor.

Signed and Sealed this

Twenty-seventh Day of October, 2009

David J. Kappos
*Director of the United States Patent and Trademark Office*